United States Patent
Hayashi et al.

(10) Patent No.: US 11,899,113 B2
(45) Date of Patent: Feb. 13, 2024

(54) VEHICLE POSITION ESTIMATION APPARATUS

(71) Applicant: TOYOTA JIDOSHA KABUSHIKI KAISHA, Toyota (JP)

(72) Inventors: Yusuke Hayashi, Susono (JP); Taichi Kawanai, Susono (JP); Sadayuki Abe, Shizuoka (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 205 days.

(21) Appl. No.: 17/483,362

(22) Filed: Sep. 23, 2021

(65) Prior Publication Data

US 2022/0137221 A1 May 5, 2022

(30) Foreign Application Priority Data

Oct. 29, 2020 (JP) .................... 2020-181690

(51) Int. Cl.
*G01S 17/89* (2020.01)
*G01S 17/46* (2006.01)
*G01J 1/42* (2006.01)
*G01S 7/48* (2006.01)

(52) U.S. Cl.
CPC .......... *G01S 17/89* (2013.01); *G01J 1/4204* (2013.01); *G01S 7/4808* (2013.01); *G01S 17/46* (2013.01)

(58) Field of Classification Search
CPC ........ G01S 17/89; G01S 7/4808; G01S 17/46; G01S 7/4804; G01S 17/894; G01S 17/931; G01S 17/06; G01J 1/4204; B60W 2420/52; G01C 21/1652; G05D 1/0231; G05D 1/0238; G06F 16/29
See application file for complete search history.

(56) References Cited

U.S. PATENT DOCUMENTS

2019/0317218 A1   10/2019  Cao et al.
2021/0147077 A1*  5/2021   Raabe ................. G01B 11/00
2022/0413112 A1* 12/2022   Katou ................. H01L 31/107

FOREIGN PATENT DOCUMENTS

JP    2020-504827 A    2/2020
WO    2019/193642 A1  10/2019

OTHER PUBLICATIONS

Seigo Ito, et al., "Localization Method based on Small Imaging Lidar and DCNN", Information Processing Society of Japan, The 79th National Convention Lecture Proceedings, Mar. 16, 2017, pp. 3-27-3-28.

* cited by examiner

*Primary Examiner* — Michelle M Iacoletti
*Assistant Examiner* — Langston Anthony Parks
(74) *Attorney, Agent, or Firm* — Sughrue Mion, PLLC

(57) ABSTRACT

The vehicle position estimation apparatus that estimates the position of the host vehicle includes: a laser light irradiation unit configured to illuminate laser light; a light reception element configured to receive reflection light of the laser light and reflection light of ambient light which is light other than the laser light and be able to detect an intensity of each of the received reflection light; and a host position estimation unit configured to estimate the position of the host vehicle, based on a result of light reception of the reflection light of the laser light received by the light reception element and a result of light reception of the reflection light of the ambient light.

2 Claims, 7 Drawing Sheets

VEHICLE POSITION ESTIMATION APPARATUS

CROSS-REFERENCE TO RELATED APPLICATION

This application claims the benefit of priority from Japanese Patent Application No. 2020-181690, filed on Oct. 29, 2020, the entire contents of which are incorporated herein by reference.

TECHNICAL FIELD

The present disclosure relates to a vehicle position estimation apparatus.

BACKGROUND

For example, the vehicle is equipped with a LIDAR that detects an object target based on the reflection light of the irradiated laser light in order to detect the surrounding object target. Further, for example, as described in the following non-patent literatures, a LIDAR, which detects an object target by using the reflection light of the irradiated laser light and the result of light reception of the reflection light of the ambient light other than the irradiated laser light, has been developed.

Non-Patent Literatures: Seigo Ito, Masayoshi Hiratsuka, Mitsuhiko Ota, Hiroyuki Matsubara, Masaru Ogawa "Localization Method based on Small Imaging LIDAR and DCNN" Information Processing Society of Japan, The 79th National Convention Lecture Proceedings

SUMMARY

By the way, the position of the host vehicle is estimated by matching the detection result of the LIDAR mounted on the vehicle with the position information of the object target included in the map information. At this time, it may be difficult to estimate the position of the host vehicle, for example, in a case of estimating the position of the host vehicle using the object target which is unlikely to be detected with laser light. As mentioned above, a LIDAR that also uses the result of light reception of the reflection light of the ambient light as a detection device for detecting an object target is disclosed. However, there is no disclosure about using such a LIDAR in estimating the position of the host vehicle by applying the LIDAR in the above case. Thus, there is room for consideration.

Therefore, the present disclosure describes a vehicle position estimation apparatus capable of accurately estimating the position of the host vehicle by using the reflection light of ambient light other than the laser light in addition to the reflection light of the laser light.

According to an aspect of the present disclosure, there is provided a vehicle position estimation apparatus that estimates a position of a host vehicle, the vehicle position estimation apparatus including: a laser light irradiation unit configured to illuminate laser light; a light reception unit configured to receive reflection light of the laser light and reflection light of ambient light which is light other than the laser light and be able to detect an intensity of each of the received reflection light; and an estimation unit configured to estimate the position of the host vehicle, based on a result of light reception of the reflection light of the laser light received by the light reception unit and a result of light reception of the reflection light of the ambient light.

The vehicle position estimation apparatus includes an estimation unit configured to estimate the position of the host vehicle, based on the result of light reception of the reflection light of the laser light and the result of light reception of the reflection light of the ambient light. For example, even in a case where there is an object target which is unlikely to be detected with laser light, the object target may be detected, based on the reflection light of the ambient light. Therefore, the vehicle position estimation apparatus is able to accurately estimate the position of the host vehicle by using the reflection light of the ambient light other than the laser light in addition to the reflection light of the laser light.

The vehicle position estimation apparatus may further include a map storage unit configured to store, in advance, laser light map information based on the result of light reception of the reflection light of the laser light and ambient light map information based on the result of light reception of the reflection light of the ambient light for each location on a map. The estimation unit may be configured to calculate laser light matching information, which is a result of matching between the laser light map information and the laser light information based on the result of light reception of the reflection light of the laser light received by the light reception unit, and ambient light matching information, which is a result of matching between the ambient light map information and the ambient light information based on the result of light reception of the reflection light of the ambient light received by the light reception unit, and estimate the position of the host vehicle, based on the calculated laser light matching information and the calculated ambient light matching information. As mentioned above, first, the vehicle position estimation apparatus calculates the laser light matching information and the ambient light matching information, and then estimates the position of the host vehicle, based on the laser light matching information and the ambient light matching information. In such a case, the vehicle position estimation apparatus is able to accurately estimate the position of the host vehicle by using the laser light matching information and the ambient light matching information.

The vehicle position estimation apparatus may further include a map storage unit configured to store, in advance, laser light map information based on the result of light reception of the reflection light of the laser light and ambient light map information based on the result of light reception of the reflection light of the ambient light for each location on a map. The estimation unit may be configured to calculate integrated sensor information, which is a result of integration between laser light information based on the result of light reception of the reflection light of the laser light received by the light reception unit and ambient light information based on the result of light reception of the reflection light of the ambient light received by the light reception unit, and integrated map information, which is a result of integration between the laser light map information and the ambient light map information, and estimate the position of the host vehicle, based on the calculated integrated sensor information and the calculated integrated map information. In such a manner, first, the vehicle position estimation apparatus calculates the integrated sensor information by integrating the ambient light information and the laser light information based on the result of light reception of the light reception unit, and then calculates integrated map information by integrating the ambient light map information and the laser light map information stored in the map storage unit. Next, the vehicle position estimation apparatus estimates the position of the host vehicle, based on the calculated integrated sensor information and the calculated integrated map information. In such a case, the vehicle position estimation apparatus is able to accurately estimate the position of the host vehicle, based on the integrated sensor information and the integrated map information.

The vehicle position estimation apparatus may further include a map storage unit configured to store, in advance, integrated map information, which is a result of integration between laser light map information based on the result of light reception of the reflection light of the laser light and ambient light map information based on the result of light reception of the reflection light of the ambient light, for each location on a map. The estimation unit may be configured to calculate integrated sensor information, which is a result of integration between laser light information based on the result of light reception of the reflection light of the laser light received by the light reception unit and ambient light information based on the result of light reception of the reflection light of the ambient light received by the light reception unit, and estimate the position of the host vehicle, based on the integrated map information and the calculated integrated sensor information. In such a manner, the map storage unit in the vehicle position estimation apparatus stores, in advance, the integrated map information which is obtained by integrating the laser light map information and the ambient light map information based on the result of light reception of the light reception unit for each location on the map. In such a case, first, the vehicle position estimation apparatus calculates integrated sensor information which is obtained by integrating the laser light information and the ambient light information based on the result of light reception of the light reception unit. Next, the vehicle position estimation apparatus estimates the position of the host vehicle, based on the integrated map information and the integrated sensor information. In such a case, the vehicle position estimation apparatus is able to accurately estimate the position of the host vehicle, based on the integrated sensor information and the integrated map information. Further, since the integrated map information is stored in advance in the map storage unit, the vehicle position estimation apparatus is able to estimate the position of the host vehicle at a higher speed.

The vehicle position estimation apparatus may further include a map storage unit configured to store, in advance, laser light map information based on the result of light reception of the reflection light of the laser light and ambient light map information based on the result of light reception of the reflection light of the ambient light for each location on a map. The estimation unit may be configured to extract a feature amount for object target detection as a laser light feature amount from the result of light reception of the reflection light of the laser light received by the light reception unit, extract a feature amount for object target detection as a laser light map feature amount from the laser light map information, and calculate laser light feature amount information which is a result of matching between the extracted laser light feature amount and the extracted laser light map feature amount, may extract a feature amount for object target detection as an ambient light feature amount from the result of light reception of the reflection light of the ambient light received by the light reception unit, extract the feature amount for object target detection as an ambient light map feature amount from the ambient light map information, and calculate ambient light feature amount information which is a result of matching between the extracted ambient light feature amount and the extracted ambient light map feature amount, and estimate the position of the host vehicle, based on the calculated laser light feature amount information and the calculated ambient light feature amount information. In such a manner, the vehicle position estimation apparatus estimates the position of the host vehicle using the feature amount for object target detection. Here, first, the vehicle position estimation apparatus extracts the laser light feature amount from the result of light reception of the laser light of the light reception unit, extracts the laser light map feature amount from the laser light map information, and then calculates the laser light feature amount information by matching the laser light map feature amount with the laser light feature amount. In addition, the vehicle position estimation apparatus extracts the ambient light feature amount from the result of light reception of the ambient light of the light reception unit, extracts the ambient light map feature amount from the ambient light map information, and performs matching between the ambient light feature amount and the ambient light map feature amount, thereby calculating the ambient light feature amount information. Next, the vehicle position estimation apparatus estimates the position of the host vehicle, based on the laser light feature amount information and the ambient light feature amount information. In such a case, the vehicle position estimation apparatus is able to accurately estimate the position of the host vehicle, based on the laser light feature amount information and the ambient light feature amount information.

The vehicle position estimation apparatus may further include a map storage unit configured to store, in advance, a laser light map feature amount, which is a feature amount for object target detection extracted from the result of light reception of the reflection light of the laser light, and an ambient light map feature amount, which is a feature amount for object target detection extracted from the result of light reception of the reflection light of the ambient light, for each location on a map. The estimation unit may be configured to extract a feature amount for object target detection as a laser light feature amount from the result of light reception of the reflection light of the laser light received by the light reception unit, and calculate laser light feature amount information, which is a result of matching between the laser light map feature amount and the extracted laser light feature amount, may extract a feature amount for object target detection as an ambient light feature amount from the result of light reception of the reflection light of the ambient light received by the light reception unit, and calculate ambient light feature amount information, which is a result of matching between the ambient light map feature amount and the extracted ambient light feature amount, and estimate the position of the host vehicle, based on the calculated laser light feature amount information and the calculated ambient light feature amount information. In such a manner, the vehicle position estimation apparatus estimates the position of the host vehicle using the feature amount for object target detection. Here, the map storage unit in the vehicle position estimation apparatus stores, in advance, the laser light map feature amount extracted from the result of light reception of the reflection light of the laser light and the ambient light map feature amount extracted from the result of light reception of the reflection light of the ambient light, for each location on the map. In such a case, first, the vehicle position estimation apparatus calculates the laser light feature amount information which is a result of matching between the laser light map feature amount and the laser light feature amount extracted from the result of light reception of the reflection light of the laser light received by the light reception unit, and calculates the ambient light feature amount information which is the result of matching between the ambient light map feature amount and the ambient light feature amount extracted from the result of light reception of the reflection light of the ambient light received by the light reception unit. Next, the vehicle position estimation apparatus estimates the position of the host vehicle, based on the laser light feature amount information and the ambient light feature amount information. In such a case, the vehicle position estimation apparatus is able to accurately estimate the position of the host vehicle, based on the laser light feature amount information and the ambient light feature amount information. Further, since the laser light map feature amount and the ambient light map feature amount are stored in advance in the map storage unit, the vehicle position estimation apparatus is able to estimate the position of the host vehicle at a higher speed.

The vehicle position estimation apparatus may further include a map storage unit configured to store, in advance, laser light map information based on the result of light reception of the reflection light of the laser light and ambient light map information based on the result of light reception of the reflection light of the ambient light for each location on a map. The estimation unit may be configured to extract a feature amount for object target detection as a laser light feature amount from the result of light reception of the reflection light of the laser light received by the light reception unit, extract a feature amount for object target detection as an ambient light feature amount from the result of light reception of the reflection light of the ambient light received by the light reception unit, and calculate a sensor feature amount information which is a result of integration between the extracted laser light feature amount and the extracted ambient light feature amount, may extract a feature amount for object target detection as a laser light map feature amount from the laser light map information, extract a feature amount for object target detection as an ambient light map feature amount from the ambient light map information, and calculate a map feature amount information, which is a result of integration of the extracted laser light map feature amount and the extracted ambient light map feature amount, and estimate the position of the host vehicle, based on the calculated sensor feature amount information and the calculated map feature amount information. In such a manner, the vehicle position estimation apparatus estimates the position of the host vehicle using the feature amount for object target detection. Here, first, the vehicle position estimation apparatus extracts the laser light feature amount from the result of light reception of the laser light of the light reception unit, extracts the ambient light feature amount from the result of light reception of the ambient light of the light reception unit, and calculates the sensor feature amount information by integrating the extracted laser light feature amount and the extracted ambient light feature amount. In addition, the vehicle position estimation apparatus extracts the laser light map feature amount from the laser light map information, extracts the ambient light map feature amount from the ambient light map information, and calculates the map feature amount information by integrating the extracted laser light map feature amount and the ambient light map feature amount. Next, the vehicle position estimation apparatus estimates the position of the host vehicle, based on the sensor feature amount information and the map feature amount information. In such a case, the vehicle position estimation apparatus is able to accurately estimate the position of the host vehicle, based on the sensor feature amount information and the map feature amount information.

The vehicle position estimation apparatus may further include a map storage unit configured to store, in advance, map feature amount information, which is a result of integration between a laser light map feature amount, which is a feature amount for object target detection extracted from the result of light reception of the reflection light of the laser light, and an ambient light map feature amount, which is a feature amount for object target detection extracted from the result of light reception of the reflection light of the ambient light, for each location on a map. The estimation unit may be configured to extract a feature amount for object target detection as a laser light feature amount from the result of light reception of the reflection light of the laser light received by the light reception unit, extract a feature amount for object target detection as the ambient light feature amount from the result of light reception of the reflection light of the ambient light received by the light reception unit, and calculate sensor feature amount information which is a result of integration between the extracted laser light feature amount and the extracted ambient light feature amount, and estimate the position of the host vehicle, based on the map feature amount and the calculated sensor feature amount information. In such a manner, the vehicle position estimation apparatus estimates the position of the host vehicle using the feature amount for object target detection. Here, the map storage unit of the vehicle position estimation apparatus stores, in advance, the integrated map feature amount information which is obtained by integrating the laser light map feature amount extracted from the result of light reception of the reflection light of the laser light and the ambient light map feature amount extracted from the result of light reception of the reflection light of the ambient light, for each location on the map. In such a case, first, the vehicle position estimation apparatus extracts the laser light feature amount from the result of light reception of the reflection light of the laser light received by the light reception unit, extracts the ambient light feature amount from the result of light reception of the reflection light of the ambient light received by the light reception unit, and calculates the sensor feature amount information which is obtained by integrating the laser light feature amount and the ambient light feature amount. Next, the vehicle position estimation apparatus estimates the position of the host vehicle, based on the map feature amount information and the calculated sensor feature amount information. As a result, the vehicle position estimation apparatus is able to accurately estimate the position of the host vehicle, based on the map feature amount information and the sensor feature amount information. Further, since the map feature amount information is stored in advance in the map storage unit, the vehicle position estimation apparatus is able to estimate the position of the host vehicle at a higher speed.

According to an aspect of the present disclosure, the position of the host vehicle can be accurately estimated by using the reflection light of the ambient light other than the laser light in addition to the reflection light of the laser light.

DETAILED DESCRIPTION

Figure 1:
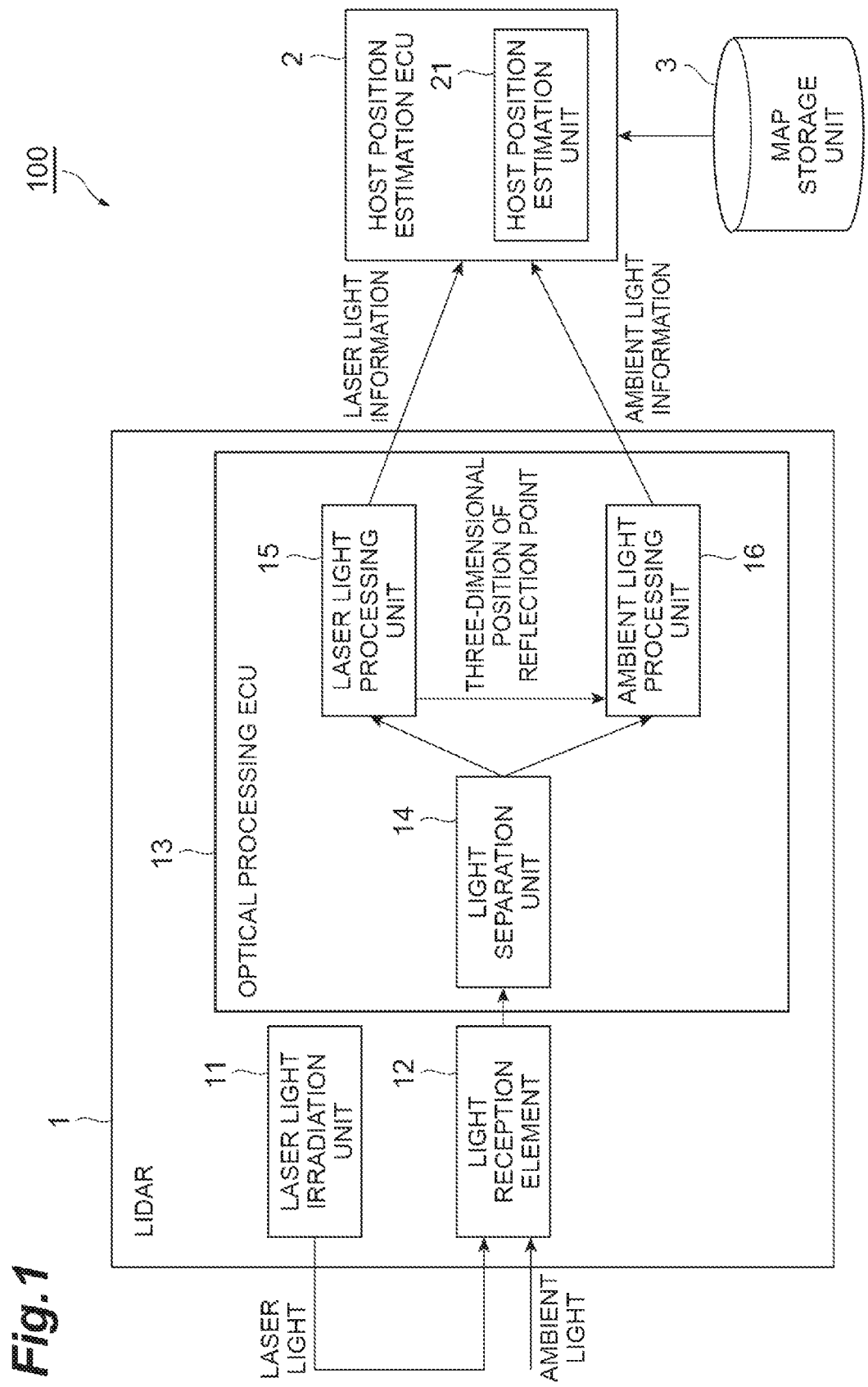
FIG. 1 is a block diagram showing an example of a vehicle position estimation apparatus according to an embodiment.

Hereinafter, exemplary embodiments will be described, with reference to the drawings. In each drawing, the same or corresponding elements are represented by the same reference numerals, and repeated description will not be given.

A vehicle position estimation apparatus 100 shown in FIG. 1 is mounted on a vehicle (host vehicle) and estimates a position of a host vehicle on a map. The information on the position of the host vehicle estimated by the vehicle position estimation apparatus 100 can be used for various controls such as automatic driving of the host vehicle. The vehicle position estimation apparatus 100 includes a light detection and ranging (LIDAR) 1, a host position estimation electronic control unit (ECU) 2, and a map storage unit 3.

The LIDAR 1 irradiates the surroundings of the host vehicle with laser light, and receives the reflection light (reflection light of the laser light) reflected by the irradiated laser light on the object target. Further, the LIDAR 1 detects the intensity of the reflection light of the laser light. In addition to the reflection light of the irradiated laser light, the LIDAR 1 in the present embodiment is able to receive the reflection light (reflection light of the ambient light) reflected by the ambient light, which is the light other than the irradiated laser light, on the object target. Further, the LIDAR 1 is able to detect the intensity of the reflection light of the received ambient light.

More specifically, the LIDAR 1 includes a laser light irradiation unit 11, a light reception element 12, and an optical processing ECU 13. The laser light irradiation unit 11 illuminates laser light toward a plurality of positions in a predetermined region around the host vehicle on which the vehicle position estimation apparatus 100 is mounted.

The light reception element 12 is able to receive the reflection light of the laser light emitted from the laser light irradiation unit 11 and output a signal corresponding to the intensity of the reflection light of the received laser light. Further, the light reception element 12 is able to receive the reflection light of the ambient light other than the laser light emitted from the laser light irradiation unit 11, and output a signal corresponding to the intensity of the reflection light of the received ambient light.

The optical processing ECU 13 is an electronic control unit which has a CPU, ROM, RAM, and the like. The optical processing ECU 13 realizes various functions by loading, for example, the programs recorded in the ROM into the RAM and executing the programs loaded in the RAM in the CPU. The optical processing ECU 13 may be composed of a plurality of electronic units.

The optical processing ECU 13 detects each of the intensity of the reflection light of the laser light received by the light reception element 12 and the intensity of the reflection light of the ambient light, based on the output signal of the light reception element 12. The optical processing ECU 13 functionally includes a light separation unit 14, a laser light processing unit 15, and an ambient light processing unit 16. In such a manner, the light reception element 12, the light separation unit 14, the laser light processing unit 15, and the ambient light processing unit 16 receive the reflection light of the laser light and the reflection light of the ambient light, and functions as a light reception unit that is able to detect the intensity of each received reflection light.

The light separation unit 14 separates the light received by the light reception element 12 into the reflection light of the laser light and the reflection light of the ambient light. For example, the light separation unit 14 is able to discriminate light having a specific flickering pattern as reflection light of laser light, and discriminate other light as reflection light of ambient light. Further, for example, the light separation unit 14 is able to discriminate the light, which is received within a predetermined time after the laser light irradiation unit 11 illuminates the laser light, as the reflection light of the laser light, and discriminate the light received at other timings as reflection light of ambient light. The predetermined time is set, in advance, based on the time from when the laser light irradiation unit 11 illuminates the laser light until the irradiated laser light is reflected by the object target around the host vehicle and the reflection light of the laser light reaches the light reception element 12. As mentioned above, the reflection light of the ambient light does not include the reflection light of the laser light emitted from the LIDAR 1. However, in a case where the ambient light includes light having the same wavelength as the laser light, the reflection light of the ambient light includes the reflection light of the light having the same wavelength as the laser light.

The laser light processing unit 15 generates laser light information (point cloud of laser light), based on the result of light reception of the reflection light of the laser light received by the light reception element 12. The laser light information is generated, based on the result of light reception of a plurality of laser light beams (result of light receptions of a plurality of reflection light beams) irradiated toward each position in a predetermined irradiation region. After the laser light irradiation is completed for all the positions in the irradiation region, the LIDAR 1 again illuminates the laser light toward each position in the irradiation region. In such a manner, the LIDAR 1 performs the next irradiation processing again after the irradiation processing of irradiating all the positions in the irradiation region with the laser light is completed. The laser light information is generated each time the LIDAR 1 performs the irradiation processing.

More specifically, the laser light processing unit 15 generates laser light point information by associating the three-dimensional position of the reflection point of the irradiated laser light with the intensity of the laser light for each of the plurality of laser light beams to be irradiated toward the irradiation region. The laser light processing unit 15 generates laser light information based on the plurality of generated laser light point information. The laser light processing unit 15 is able to measure the three-dimensional position of the reflection point of the laser light, based on the irradiation angle of the laser light emitted from the laser light irradiation unit 11 and the arrival time from the irradiation of the laser light until the reflection light of the laser light reaches the light reception element 12.

The ambient light processing unit 16 generates ambient light information (point cloud of ambient light), based on the result of light reception of the reflection light of the ambient light received by the light reception element 12. The ambient light information is generated every time the LIDAR 1 performs irradiation processing of illuminating a plurality of laser light beams into the irradiation region, similarly to the laser light information.

More specifically, first, the ambient light processing unit 16 acquires the three-dimensional position of the reflection point of the laser light from the laser light processing unit 15. Here, in a state where the state of each part of the LIDAR 1 such as the irradiation angle of the laser light is not changed, the position of the reflection point of the laser light received by the light reception element 12 and the position of the reflection point of the ambient light are the same as each other. Therefore, the LIDAR 1 detects the intensity of the reflection light of the ambient light in the state in a case where the reflection light of the laser light is received. Thereby, it is possible to detect the intensity of the reflection light of the ambient light reflected at the same position as the reflection point of the laser light. Therefore, the ambient light processing unit 16 generate the ambient light point information by associating the three-dimensional position of the reflection point of the laser light acquired from the laser light processing unit 15 with the intensity of the reflection light of the ambient light received by the light reception element 12. The ambient light point information is generated for each of a plurality of laser light beams emitted toward the irradiation region. The ambient light processing unit 16 generates ambient light information, based on the plurality of generated ambient light point information.

In such a manner, the LIDAR 1 is able to generate laser light information and ambient light information, based on the result of light reception of the light reception element 12. That is, the LIDAR 1 is able to generate the laser light information and the ambient light information, based on the result of light reception of one light reception element 12. Therefore, it is not necessary to calibrate the laser light information and the ambient light information.

The map storage unit 3 stores, in advance, the position estimation information used in a case where the host position estimation ECU 2 estimates the position of the host vehicle. The position estimation information is generated, based on, for example, the laser light information and the ambient light information generated in the past by the LIDAR 1, and is stored in the map storage unit 3 in advance. For example, the vehicle position estimation apparatus 100 may measure the surroundings of the host vehicle by the LIDAR 1 in a case where the host vehicle travels, and may store the position estimation information, which is generated based on the laser light information and the ambient light information generated by the LIDAR 1, in the map storage unit 3.

The host position estimation ECU 2 is an electronic control unit which has the same configuration as the optical processing ECU 13. The host position estimation ECU 2 may be integrally configured with the optical processing ECU 13 of the LIDAR 1. The host position estimation ECU 2 functionally includes a host position estimation unit (estimation unit) 21.

The host position estimation unit 21 estimates the position of the host vehicle, based on the result of light reception (laser light information) of the reflection light of the laser light received by the light reception element 12 and the result of light reception (ambient light information) of the reflection light of the ambient light. Here, the host position estimation unit 21 estimates the position of the host vehicle by cross-checking the result of light reception of the reflection light of the laser light and the ambient light with the position estimation information which is stored in the map storage unit 3. The method of estimating the position of the host vehicle will be described in detail later.

Figure 2:
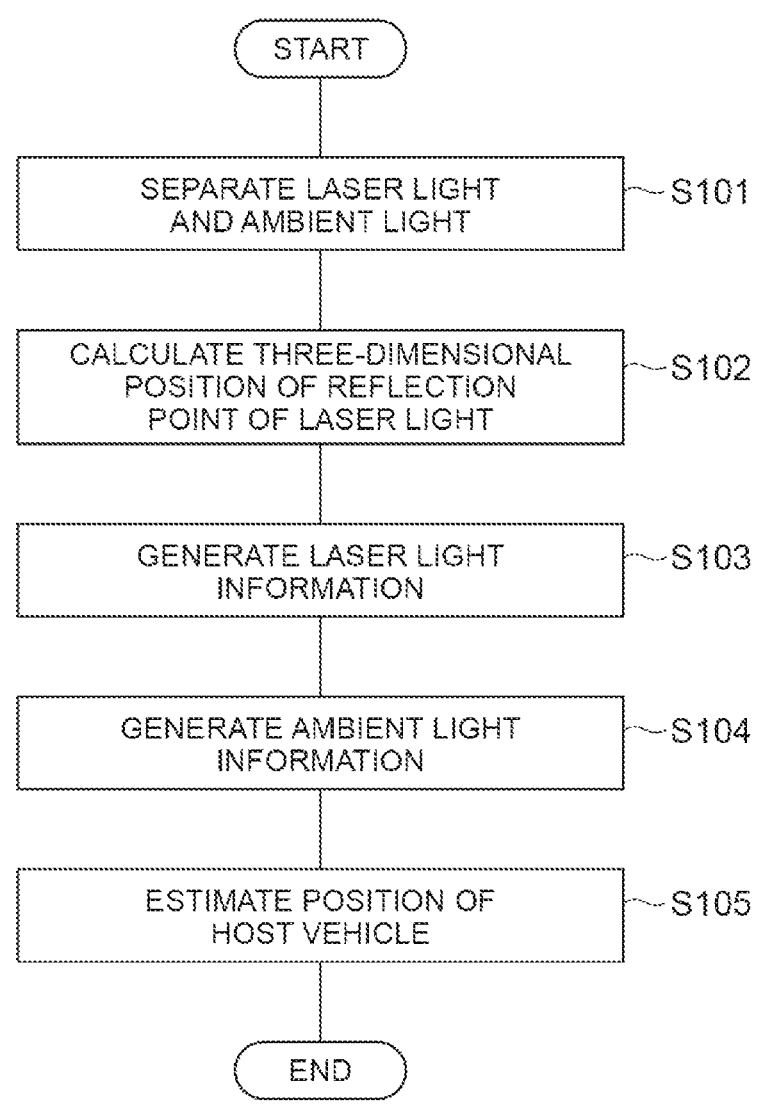
FIG. 2 is a flowchart showing the flow of the estimation processing of the position of the host vehicle.

Next, the flow of the position estimation processing of the host vehicle performed by the vehicle position estimation apparatus 100 will be described with reference to the flowchart of FIG. 2. It should be noted that the processing shown in FIG. 2 is repeatedly executed at predetermined time intervals. As shown in FIG. 2, the light separation unit 14 separates the light, which is received by the light reception element 12, into the reflection light of the laser light and the reflection light of the ambient light (S101). The laser light processing unit 15 calculates a three-dimensional position of a reflection point of the irradiated laser light (S102). Further, the laser light processing unit 15 generates laser light information including a plurality of laser light point information in which the three-dimensional position of the reflection point of the irradiated laser light and the intensity of the laser light are associated with each other (S103).

The ambient light processing unit 16 acquires the three-dimensional position of the reflection point of the laser light calculated by the laser light processing unit 15, and generates ambient light point information, based on the three-dimensional position of the acquired reflection point and the intensity of the reflection light of the ambient light. Then, the ambient light processing unit 16 generates ambient light information including the plurality of generated ambient light point information (S104). The host position estimation unit 21 estimates the position of the host vehicle, based on the generated laser light information and ambient light information (S105).

Hereinafter, examples of various methods of estimating the position of the host vehicle performed by the host position estimation unit 21 will be described.

(First Method)

First, a first method of estimating the position of the host vehicle will be described. Here, the position estimation information, which is stored in the map storage unit 3 in the first method of estimating the position of the host vehicle, will be described. The map storage unit 3 stores, in advance, laser light map information and ambient light map information as position estimation information, for each location on the map.

The laser light map information is information which is generated based on the result of light reception of the reflection light of the laser light. The laser light map information, which is stored in the map storage unit 3, and the laser light information, which is generated by the laser light processing unit 15, are the same kind of information that can be compared. Specifically, as an example, the laser light information, which is generated in the past by the laser light processing unit 15, is stored in the map storage unit 3 as the laser light map information. The ambient light map information is information which is generated based on the result of light reception of the reflection light of the ambient light. The ambient light map information, which is stored in the map storage unit 3, and the ambient light information, which is generated by the ambient light processing unit 16, are the same kind of information that can be compared. Specifically, as an example, the ambient light information, which is generated in the past by the ambient light processing unit 16, is stored in the map storage unit 3 as the ambient light map information.

Figure 3:
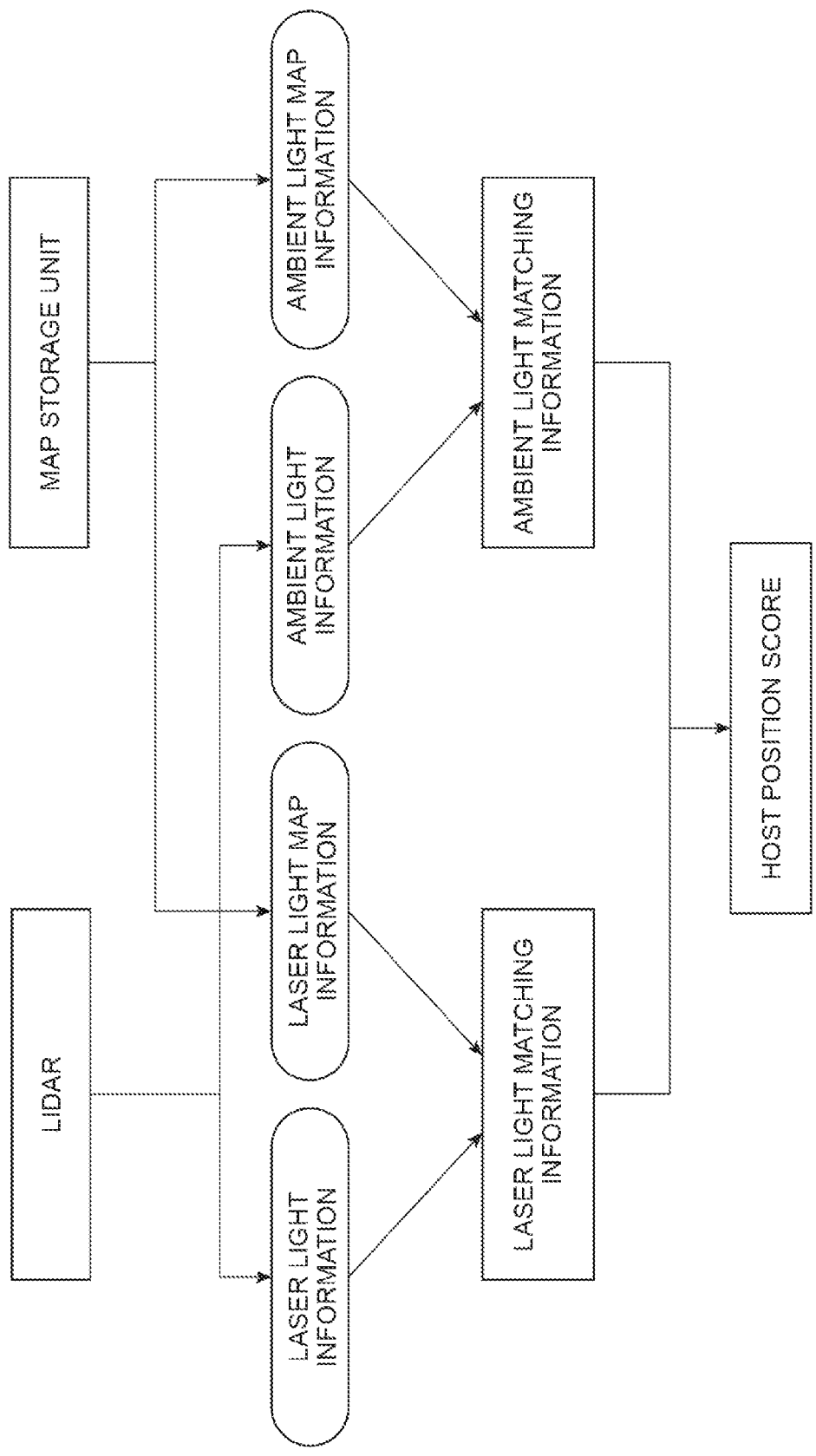
FIG. 3 is a conceptual diagram showing transitions of various kinds of information used in a case where position estimation is performed by the first method.

Hereinafter, a conceptual diagram showing transitions of various kinds of information used in a case where performing position estimation by the first method, which is shown in FIG. 3, will be described. As shown in FIG. 3, the host position estimation unit 21 calculates the laser light matching information which is a result of matching of the laser light information generated by the laser light processing unit 15 of the LIDAR 1 and the laser light map information stored in the map storage unit 3. Further, the host position estimation unit 21 calculates the ambient light matching information which is the result of matching between the ambient light information generated by the ambient light processing unit 16 of the LIDAR 1 and the ambient light map information stored in the map storage unit 3.

Next, the host position estimation unit 21 calculates the host position score, based on the calculated laser light matching information and the ambient light matching information. The host position score indicates the possibility (probability) that the host vehicle is present at a location on the map associated with the laser light map information and the ambient light map information used in a case of calculating the laser light matching information and the ambient light matching information. In a case of calculating the host position score, the host position estimation unit 21 calculates the host position score by using the laser light map information and the ambient light map information corresponding to a position (position on the map) different from that in the laser light map information and the ambient light map information used at the time of calculating the current host position score. In such a manner, the host position estimation unit 21 calculates the host position score, for each location on the map associated with the laser light map information and the ambient light map information. Then, the host position estimation unit 21 estimates the position of the host vehicle on the map by a well-known method, based on the host position score, for each location.

(Specific Example of First Method)

A more detailed specific example in the first method will be described.

(1) The host position estimation unit 21 calculates a degree of coincidence between the laser light information generated by the laser light processing unit 15 of the LIDAR 1 and the laser light map information stored in the map storage unit 3 as a score 1. The host position estimation unit 21 is able to calculate the score 1, based on, for example, the degree of coincidence between the three-dimensional position of the reflection point and the reflection intensity value in the laser light information and the laser light map information. The score 1 corresponds to the laser light matching information mentioned above.

(2) Further, the host position estimation unit 21 calculates a degree of coincidence between the ambient light information generated by the ambient light processing unit 16 of the LIDAR 1 and the ambient light map information stored in the map storage unit 3 as a score 2. The host position estimation unit 21 is able to calculate the score 2, based on, for example, the degree of coincidence between the three-dimensional position of the reflection point and the reflection intensity value in the ambient light information and the ambient light map information. The score 2 corresponds to the ambient light matching information mentioned above.

(3) The host position estimation unit 21 calculates an integrated score, based on the calculated scores 1 and 2. For example, the host position estimation unit 21 may calculate the integrated score, as follows, using the function f.

Integrated score=$f$(score 1,score 2)

In addition, the host position estimation unit 21 calculates the host position score, based on the integrated score. Here, the host position estimation unit 21 may calculate the host position score by performing weighting such as multiplying the integrated score by a weight coefficient. The host position estimation unit 21 calculates the host position score, for each location on the map associated with the laser light map information and the ambient light map information.

(4) Then, the host position estimation unit 21 estimates the position of the host vehicle on the map by a well-known method, based on the host position score, for each location.

(Second Method)

A second method of estimating the position of the host vehicle will be described. Here, the position estimation information, which is stored in the map storage unit 3 in the second method of estimating the position of the host vehicle, will be described. As the position estimation information, the map storage unit 3 stores the laser light map information and the ambient light map information, in advance, for each location on the map, as in the case of the first method.

Figure 4:
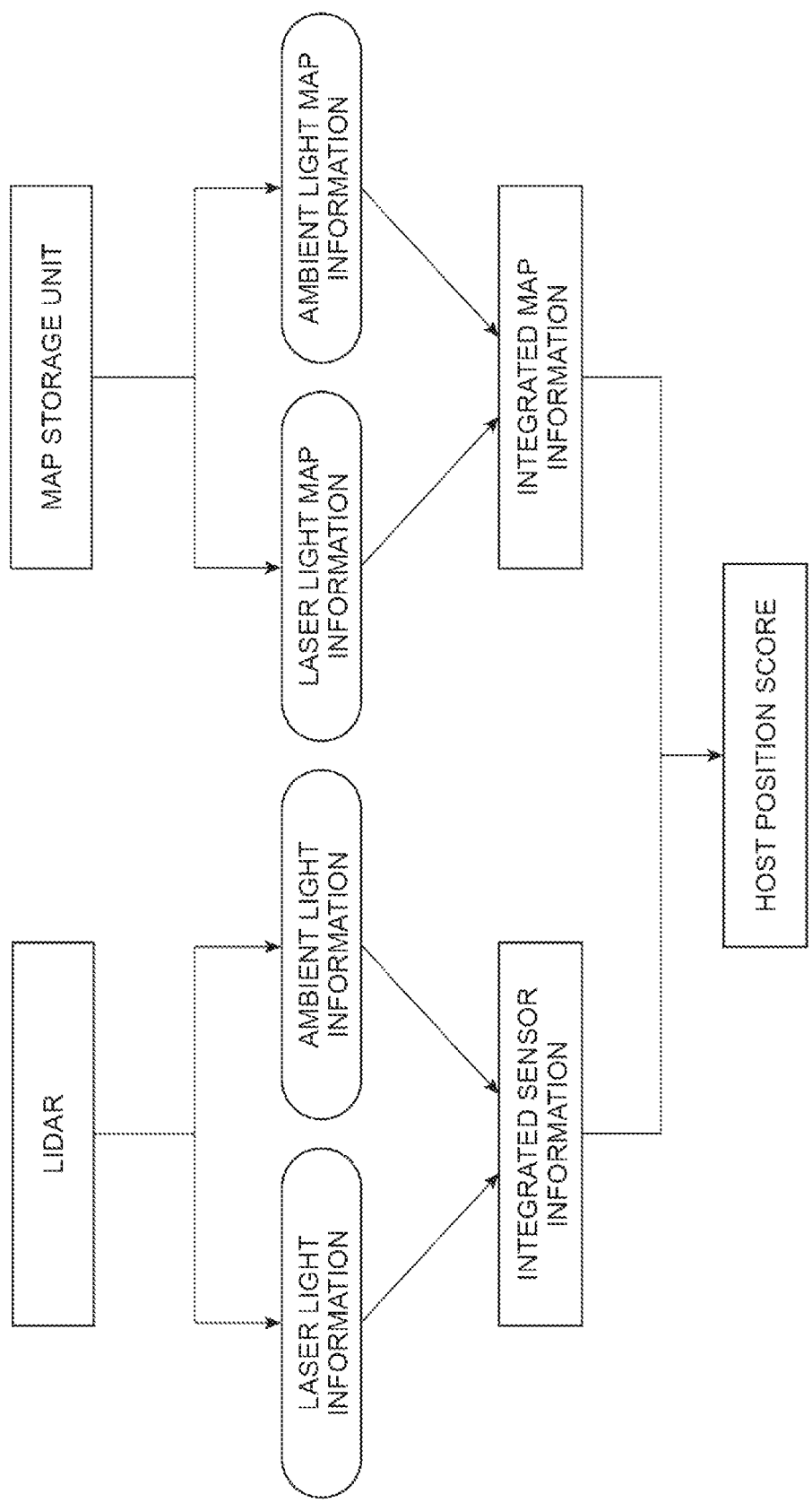
FIG. 4 is a conceptual diagram showing transitions of various kinds of information used in a case where position estimation is performed by the second method.

Hereinafter, a conceptual diagram showing transitions of various kinds of information used in a case where performing position estimation by the second method, which is shown in FIG. 4, will be described. As shown in FIG. 4, the host position estimation unit 21 integrates the laser light information generated by the laser light processing unit 15 of the LIDAR 1 and the ambient light information generated by the ambient light processing unit 16, and calculates the result of integration as integrated sensor information. Further, the host position estimation unit 21 integrates the laser light map information, which is stored in the map storage unit 3 and the ambient light map information, and calculates the integrated result as the integrated map information.

Next, the host position estimation unit 21 calculates the host position score, based on the degree of coincidence between the calculated integrated sensor information and the calculated integrated map information. The host position score indicates the possibility (probability) that the host vehicle is present at a location on the map associated with the laser light map information and the ambient light map information used in a case of calculating the integrated map information. The host position estimation unit 21 calculates the host position score, for each location on the map associated with the laser light map information and the ambient light map information. Then, the host position estimation unit 21 estimates the position of the host vehicle on the map by a well-known method, based on the host position score, for each location.

(Specific Example of Second Method)

A more detailed specific example in a second method will be described. First, a first example of the second method will be described.

(1) The host position estimation unit 21 calculates an intensity score, for each reflection point, based on the intensity value of the reflection light of the laser light in the laser light information generated by the LIDAR 1 and the intensity value of the reflection light of the ambient light in the ambient light information generated by the LIDAR 1. The intensity score may be calculated by performing a predetermined calculation using the intensity value of the reflection light of the laser light and the intensity value of the reflection light of the ambient light. Then, the host position estimation unit 21 generates integrated sensor information, based on the three-dimensional position of the reflection point and the calculated intensity score. The integrated sensor information is composed of, for example, a data group of (X, Y, Z, intensity score).

(2) Further, the host position estimation unit 21 calculates the map intensity score, for each reflection point, based on the intensity value of the reflection light of the laser light in the laser light map information stored in the map storage unit 3 and the intensity value of the reflection light of the ambient light in the ambient light map information stored in the map storage unit 3. The intensity score may be calculated by performing a predetermined calculation using the intensity value of the reflection light of the laser light and the intensity value of the reflection light of the ambient light. Then, the host position estimation unit 21 generates integrated map information, based on the three-dimensional position of the reflection point and the calculated map intensity score. The integrated map information is composed of, for example, a data group of (X, Y, Z, map intensity score).

(3) The host position estimation unit 21 calculates the host position score, based on the degree of coincidence between the generated integrated sensor information and the integrated map information. Here, the host position estimation unit 21 is able to calculate the host position score, based on, for example, the degree of coincidence of the three-dimensional positions of the reflection points and the degree of coincidence between the intensity score and the map intensity score. The host position estimation unit 21 calculates the host position score, for each location on the map associated with the laser light map information and the ambient light map information.

(4) Then, the host position estimation unit 21 estimates the position of the host vehicle on the map by a well-known method, based on the host position score, for each location.

Next, a second example of the second method will be described.

(1) The host position estimation unit 21 extracts the feature amount from the laser light information generated by the LIDAR 1 and extracts the feature amount from the ambient light information generated by the LIDAR 1. The feature amount is a feature amount for object target detection, and is, for example, a feature that can be used for detecting an object target from an image.

(2) Next, the host position estimation unit 21 assigns the attribute of the object target, which is indicated by the feature amount, to the feature amount extracted from the laser light information. Further, the host position estimation unit 21 assigns the attribute of the object target, which is indicated by the feature amount, to the feature amount extracted from the ambient light information.

(3) The host position estimation unit 21 integrates the laser light information and the ambient light information, thereby generating integrated sensor information. At that time, the host position estimation unit 21 adds the attribute information of the feature amount extracted from the laser light information and the ambient light information, thereby generating the integrated sensor information. In a case where a plurality of feature amounts are extracted, a plurality of feature amount attribute information are added. Further, the host position estimation unit 21 calculates the attribute score of the feature amount and adds the calculated attribute score to the feature amount, thereby generating the integrated sensor information. The attribute score indicates, for example, the certainty of recognition of the attribute which is indicated by the extracted feature amount. For example, the host position estimation unit 21 calculates the attribute score such that the attribute score is set to be high in a case where the same feature amount is extracted from the laser light information and the ambient light information and the attributes are the same, and calculate the attribute score such that the attribute score is set to be low in a case where the same feature amount is extracted and the attributes are different from each other. For example, in a case where a plurality of feature amounts are extracted and the attributes of each feature amount are "white line, signboard, road surface, and moving object", the host position estimation unit 21 may give multi-class attribute scores such as "white line: 0.7, signboard: 0.05, road surface: 0.2, and moving object: 0.1", for each feature amount.

(4) The host position estimation unit 21 also extracts the feature amounts and assigns the attributes to the laser light map information and the ambient light map information stored in the map storage unit 3 in the same manner as in the above (1) to (3), and then calculates the attribute scores. Then, the host position estimation unit 21 generates integrated map information which is obtained by integrating the laser light map information and the ambient light map information, as in the integrated sensor information to which the attributes and the attribute scores are added.

(5) The host position estimation unit 21 calculates the host position score, based on the degree of coincidence between the calculated integrated sensor information and the calculated integrated map information. Here, the host position estimation unit 21 is able to calculate the host position score, based on, for example, the degree of coincidence of the three-dimensional positions of the reflection points, the degree of coincidence of the attribute scores, and the like. The host position estimation unit 21 calculates the host position score, for each location on the map associated with the laser light map information and the ambient light map information.

(6) Then, the host position estimation unit 21 estimates the position of the host vehicle on the map by a well-known method, based on the host position score, for each location.

In the second method, the map storage unit 3 stores, in advance, laser light map information and ambient light map information as position estimation information, for each location on the map. The present example is not limited to this, and the map storage unit 3 may store in advance, as position estimation information, integrated map information which is a result of integration between the laser light map information based on the result of light reception of the reflection light of the laser light and the ambient light map information based on the result of light reception of the reflection light of the ambient light, for each location on the map. That is, in the second method mentioned above, the host position estimation unit 21 generates the integrated map information. However, the integrated map information, in which the laser light map information and the ambient light map information are integrated, may be written in advance in the map storage unit 3.

In such a case, the host position estimation unit 21 integrates the laser light information generated by the laser light processing unit 15 of the LIDAR 1 and the ambient light information generated by the ambient light processing unit 16, and calculates the result of integration as integrated sensor information. Then, the host position estimation unit 21 is able to estimate the position of the host vehicle, based on the generated integrated sensor information and the integrated map information stored in the map storage unit 3.

(Third Method)

A third method of estimating the position of the host vehicle will be described. Here, in the third method of estimating the position of the host vehicle, the position estimation information, which is stored in the map storage unit 3, will be described. As the position estimation information, the map storage unit 3 stores the laser light map information and the ambient light map information, in advance, for each location on the map, as in the case of the first method.

Figure 5:
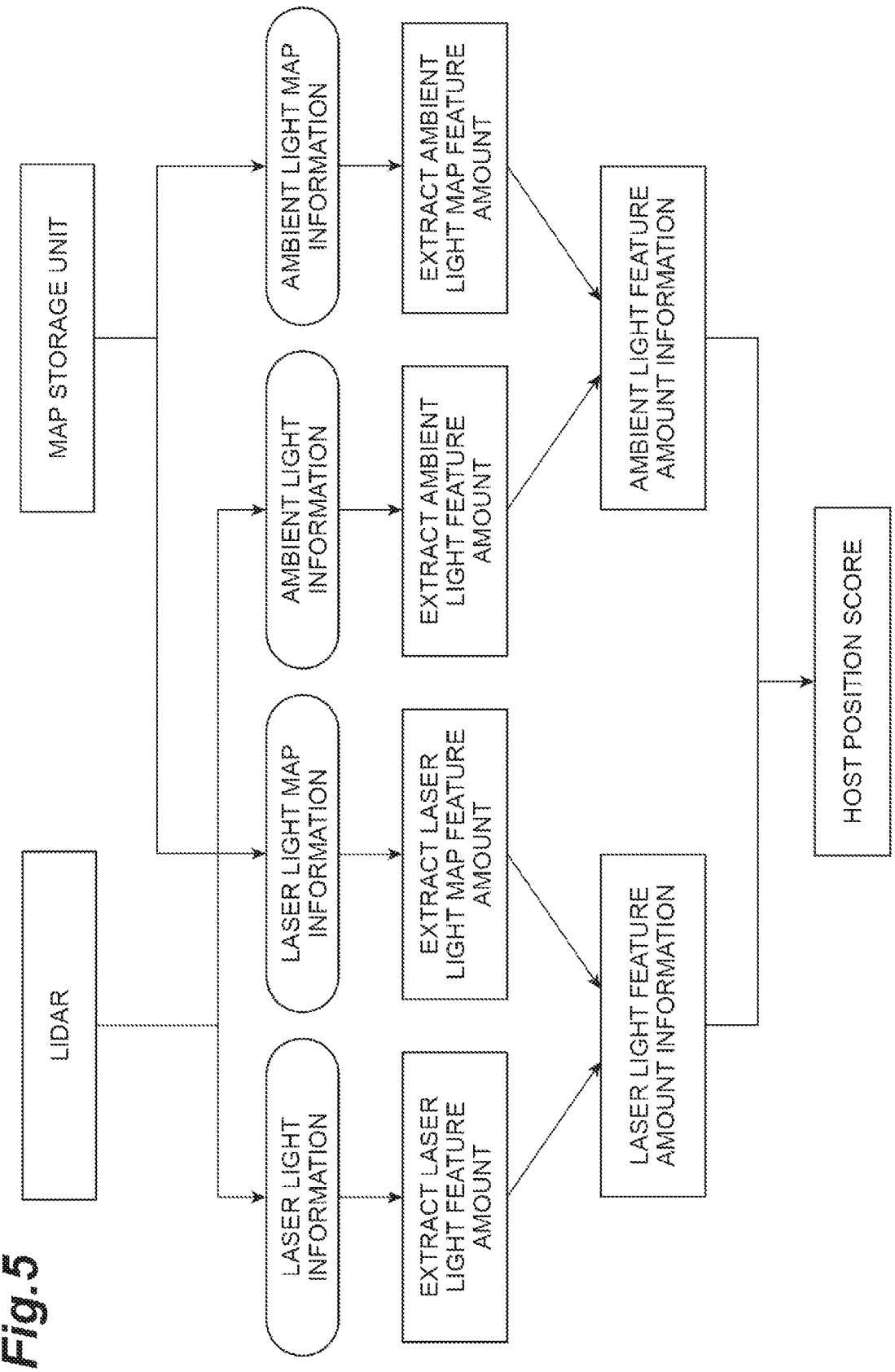
FIG. 5 is a conceptual diagram showing transitions of various kinds of information used in a case where position estimation is performed by the third method.

Hereinafter, a conceptual diagram showing transitions of various kinds of information used in a case where performing position estimation by the third method, which is shown in FIG. 5, will be described. As shown in FIG. 5, the host position estimation unit 21 extracts a feature amount for object target detection as the laser light feature amount from the laser light information generated by the laser light processing unit 15 of the LIDAR 1, and extracts a feature amount for object target detection as the laser light map feature amount from the laser light map information stored in the map storage unit 3. The host position estimation unit 21 calculates the result of matching between the extracted laser light feature amount and the extracted laser light map feature amount, as the laser light feature amount information.

Further, the host position estimation unit 21 extracts a feature amount for object target detection as the ambient light feature amount from the ambient light information generated by the ambient light processing unit 16 of the LIDAR 1, and extracts a feature amount for object target detection as the ambient light map feature amount from the ambient light map information stored in the map storage unit 3. The host position estimation unit 21 calculates the result of matching between the extracted ambient light feature amount and the extracted ambient light map feature amount as the ambient light feature amount information.

Then, the host position estimation unit 21 calculates the host position score, based on the degree of coincidence between the calculated laser light feature amount information and the calculated ambient light feature amount information. The host position score indicates the possibility (probability) that the host vehicle is present at a location on the map associated with the laser light map information and the ambient light map information used in a case of calculating the laser light feature amount information and the ambient light feature amount information. The host position estimation unit 21 calculates the host position score, for each location on the map associated with the laser light map information and the ambient light map information. Then, the host position estimation unit 21 estimates the position of the host vehicle on the map by a well-known method, based on the host position score, for each location.

(Specific Example of Third Method)

A more detailed specific example in the third method will be described.

(1) The host position estimation unit 21 extracts the laser light feature amount from the laser light information generated by the laser light processing unit 15 of the LIDAR 1, and extracts the laser light map feature amount from the laser light map information which is stored in the map storage unit 3. The host position estimation unit 21 calculates a degree of coincidence between the extracted laser light feature amount and the extracted laser light map feature amount as a score 1. The host position estimation unit 21 is able to calculate the score 1, based on, for example, the degree of coincidence of the feature amount point cloud, the degree of matching of the shape of the feature amount point cloud, the degree of matching of the feature amount attribute, and the like. The score 1 corresponds to the laser light feature amount information mentioned above.

(2) Further, the host position estimation unit 21 extracts the ambient light feature amount from the ambient light information generated by the ambient light processing unit 16 of the LIDAR 1, and extracts the ambient light map feature amount from the ambient light map information which is stored in the map storage unit 3. The host position estimation unit 21 calculates a degree of coincidence between the extracted ambient light feature amount and the extracted ambient light map feature amount as a score 2. The host position estimation unit 21 is able to calculate the score 2, based on, for example, the degree of matching of the feature amount point cloud, the degree of matching of the shape of the feature amount point cloud, the degree of matching of the feature amount attribute, and the like. The score 2 corresponds to the ambient light feature amount information mentioned above.

(3) The host position estimation unit 21 calculates an integrated feature amount score which is calculated based on the calculated score 1 and score 2. For example, the host position estimation unit 21 may calculate the integrated feature amount score as follows using the function f.

$$\text{Integrated Feature Amount Score} = f(\text{score 1}, \text{score 2})$$

In addition, the host position estimation unit 21 calculates the host position score, based on the integrated feature amount score. Here, the host position estimation unit 21 may calculate the host position score by performing weighting such as multiplying the integrated feature amount score by the weight coefficient. The host position estimation unit 21 calculates the host position score, for each location on the map associated with the laser light map information and the ambient light map information.

(4) Then, the host position estimation unit 21 estimates the position of the host vehicle on the map by a well-known method, based on the host position score, for each location.

In the third method, the map storage unit 3 stores, in advance, laser light map information and ambient light map information as position estimation information, for each location on the map. The present example is not limited to this, and the map storage unit 3 may store, in advance, a laser light map feature amount extracted from the result of light reception of the reflection light of the laser light and an ambient light map feature amount extracted from the result of light reception of the reflection light of the ambient light as position estimation information, for each location on the map. That is, in the third method mentioned above, the host position estimation unit 21 extracts the laser light map feature amount and the ambient light map feature amount. However, the laser light map feature amount and the ambient light map feature amount respectively extracted from the laser light map information and the ambient light map information may be written in advance in the map storage unit 3.

In such a case, the host position estimation unit 21 extracts the laser light feature amount from the laser light information generated by the laser light processing unit 15 of the LIDAR 1, and calculates, as the laser light feature amount information, the result of matching between the laser light map feature amount stored in the map storage unit 3 and the extracted laser light feature amount. Further, the host position estimation unit 21 extracts the ambient light feature amount from the ambient light information generated by the ambient light processing unit 16 of the LIDAR 1, and calculates, as the ambient light feature amount information, the result of matching between the ambient light map feature amount stored in the map storage unit 3 and the extracted ambient light feature amount. Then, the host position estimation unit 21 is able to estimate the position of the host vehicle, based on the calculated laser light feature amount information and the calculated ambient light feature amount information.

(Fourth Method)

A fourth method of estimating the position of the host vehicle will be described. Here, in the fourth method of estimating the position of the host vehicle, the position estimation information, which is stored in the map storage unit 3, will be described. As the position estimation information, the map storage unit 3 stores the laser light map information and the ambient light map information, in advance, for each location on the map, as in the case of the first method.

Figure 6:
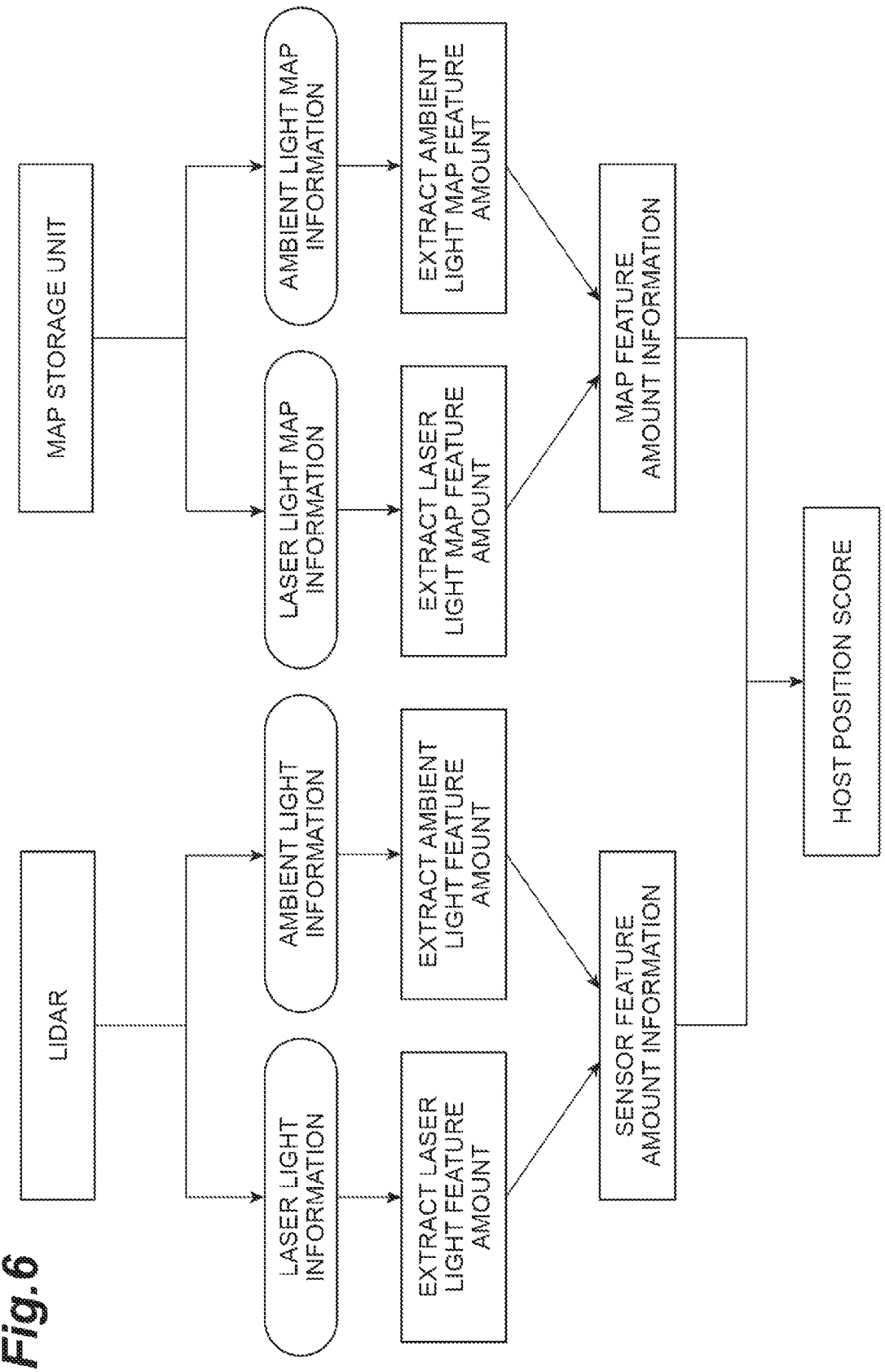
FIG. 6 is a conceptual diagram showing transitions of various kinds of information used in a case where position estimation is performed by the fourth method.

Hereinafter, a conceptual diagram showing transitions of various kinds of information used in a case where performing position estimation by the fourth method, which is shown in FIG. 6, will be described. As shown in FIG. 6, the host position estimation unit 21 extracts a feature amount for object target detection as the laser light feature amount from the laser light information generated by the laser light processing unit 15 of the LIDAR 1, and extracts a feature amount for object target detection as the ambient light feature amount from the ambient light information generated by the ambient light processing unit 16 of the LIDAR 1. The host position estimation unit 21 calculates the integrated result of the extracted laser light feature amount and the extracted ambient light feature amount as the sensor feature amount information.

Further, the host position estimation unit 21 extracts a feature amount for object target detection as the laser light map feature amount from the laser light map information stored in the map storage unit 3, and extracts a feature amount for object target detection as the ambient light map feature amount from the ambient light map information stored in the map storage unit 3. The host position estimation unit 21 calculates the integrated result of the extracted laser light map feature amount and the ambient light map feature amount as the map feature amount information.

Then, the host position estimation unit 21 calculates the host position score, based on the degree of coincidence between the calculated sensor feature amount information and the calculated map feature amount information. The host position score indicates the possibility (probability) that the host vehicle is present at a location on the map associated with the laser light map information and the ambient light map information used in a case of calculating the map feature amount information. The host position estimation unit 21 calculates the host position score, for each location on the map associated with the laser light map information and the ambient light map information. Then, the host position estimation unit 21 estimates the position of the host vehicle on the map by a well-known method, based on the host position score, for each location.

(Specific Example of Fourth Method)

A more detailed specific example in the fourth method will be described. First, a first example of the fourth method will be described.

(1) The host position estimation unit 21 extracts the laser light feature amount from the laser light information generated by the laser light processing unit 15 of the LIDAR 1, and extracts the ambient light feature amount from the ambient light information generated by the ambient light processing unit 16 of the LIDAR 1. The host position estimation unit 21 selects only the feature amounts that match each other from the extracted laser light feature amount and the extracted ambient light feature amount, and calculates the selected feature amount as the sensor feature amount information.

(2) The host position estimation unit 21 extracts the laser light map feature amount from the laser light map information, which is stored in the map storage unit 3, and extracts the ambient light map feature amount from the ambient light map information which is stored in the map storage unit 3. The host position estimation unit 21 selects only the feature amounts that match each other from the extracted laser light map feature amount and the ambient light map feature amount, and calculates the selected feature amount as the map feature amount information.

(3) The host position estimation unit 21 calculates the host position score by various well-known methods based on the degree of coincidence between the calculated sensor feature amount information and the calculated map feature amount information. The host position estimation unit 21 calculates the host position score, for each location on the map associated with the laser light map information and the ambient light map information.

(4) Then, the host position estimation unit 21 estimates the position of the host vehicle on the map by a well-known method, based on the host position score, for each location.

Next, a second example of the fourth method will be described.

(1) The host position estimation unit 21 extracts the laser light feature amount from the laser light information generated by the laser light processing unit 15 of the LIDAR 1, and extracts the ambient light feature amount from the ambient light information generated by the ambient light processing unit 16 of the LIDAR 1. The host position estimation unit 21 synthesizes the extracted laser light feature amount and the extracted ambient light feature amount, and calculates the synthesized feature amount as the sensor feature amount information. Further, in a case where the host position estimation unit 21 calculates the sensor feature amount information, the host position estimation unit 21 adds a score to the synthesized feature amount, thereby generating the sensor feature amount information. For example, the host position estimation unit 21 increases the score for the feature amount extracted using both the laser light information and the ambient light information as a score given to the synthesized feature amount, and decreases the score for the feature amount extracted using only one of the laser light information and the ambient light information. For example, the host position estimation unit 21 sets the score to 3 for the feature amount extracted from both the laser light information and the ambient light information, sets the score to 2 for the feature amount extracted only from the laser light information, and sets the score to 1 for the feature amount extracted only from the ambient light information.

(2) Regarding the laser light map information and the ambient light map information stored in the map storage unit 3, the host position estimation unit 21 also extracts the laser light map feature amount and the ambient light map feature amount in the same manner as in (1) mentioned above, and calculates the score. Then, in the same manner as the sensor feature amount information in which the score is given to the synthesized feature amount, the host position estimation unit 21 calculates the map feature amount information in which the laser light map feature amount and the ambient light map feature amount are synthesized and the score is given thereto.

(3) The host position estimation unit 21 calculates the host position score by various well-known methods based on the degree of coincidence between the calculated sensor feature amount information and the calculated map feature amount information. The host position estimation unit 21 calculates the host position score, for each location on the map associated with the laser light map information and the ambient light map information.

(4) Then, the host position estimation unit 21 estimates the position of the host vehicle on the map by a well-known method, based on the host position score, for each location.

In the fourth method, the map storage unit 3 stores, in advance, laser light map information and ambient light map information as position estimation information, for each location on the map. The present example is not limited to this, and the map storage unit 3 may store, in advance, map feature amount information, which is a result of integration between the laser light map feature amount extracted from the result of light reception of the reflection light of the laser light and the ambient light map feature amount extracted from the result of light reception of the ambient light as position estimation information, for each location on the map. That is, in the fourth method mentioned above, the host position estimation unit 21 calculates the map feature amount information. However, the map feature amount information, in which the laser light map feature amount and the ambient light map feature amount are integrated, may be written in advance in the map storage unit 3.

In such a case, the host position estimation unit 21 extracts the laser light feature amount from the laser light information generated by the laser light processing unit 15 of the LIDAR 1, and extracts the ambient light feature amount from the ambient light information generated by the ambient light processing unit 16 of the LIDAR 1. The host position estimation unit 21 calculates the integrated result of the extracted laser light feature amount and the extracted ambient light feature amount as the sensor feature amount information. Then, the host position estimation unit 21 is able to estimate the position of the host vehicle, based on the calculated sensor feature amount information and the map feature amount stored in the map storage unit 3.

(Fifth Method)

A fifth method of estimating the position of the host vehicle will be described. In the fifth method, the host position estimation unit 21 calculates the host position score, based on the result of matching between the ambient light feature amount extracted from the ambient light information generated by the LIDAR 1 and the ambient light map feature amount extracted from the ambient light map information which is stored in the map storage unit 3. In a case of calculating this host position score, the host position score is weighted, based on the reflection intensity of the laser light detected by the LIDAR 1. The host position estimation unit 21 calculates this host position score, for each location on the map to which the ambient light map information is associated. Then, the host position estimation unit 21 estimates the position of the host vehicle on the map by a well-known method, based on the host position score, for each location.

(Specific Example of Fifth Method)

A more detailed specific example in the fifth method will be described. First, a first example of the fifth method will be described.

(1) The host position estimation unit 21 performs matching between an ambient light feature amount extracted from the ambient light information generated by the LIDAR 1 and an ambient light map feature amount extracted from the ambient light map information, which is stored in the map storage unit 3. The host position estimation unit 21 calculates the attributes of the matching feature amount as a result of matching. In a case where the host position estimation unit 21 is related to the attribute of the matched feature amount and the reflection intensity of the laser light detected by the LIDAR 1, the host position estimation unit 21 calculates the host position score by giving the score, in which the reflection intensity of the laser light is considered, to the feature amount.

For example, in a case where the attribute of the feature amount is a white line or a signboard and the reflection intensity of the laser light is high, a high score is given to this feature amount, and the host position score is high. On the contrary, for example, in a case where the attribute of the feature amount is a white line or a signboard and the reflection intensity of the laser light is low, a low score is given to this feature amount, and the host position score is low. Further, for example, in a case where the attribute of the feature amount is a road surface, a pole, or a curb and the reflection intensity of the laser light is low, a high score is given to this feature amount, and the host position score is high. On the contrary, for example, in a case where the attribute of the feature amount is a road surface, a pole, or a curb and the reflection intensity of the laser light is high, a low score is given to this feature amount, and the host position score is low.

(2) The host position estimation unit 21 calculates the host position score, for each location on the map to which the ambient light map information is associated.

(3) Then, the host position estimation unit 21 estimates the position of the host vehicle on the map by a well-known method, based on the host position score, for each location.

Next, a second example of the fifth method will be described.

(1) The host position estimation unit 21 performs matching between an ambient light feature amount extracted from the ambient light information generated by the LIDAR 1 and an ambient light map feature amount extracted from the ambient light map information, which is stored in the map storage unit 3. The host position estimation unit 21 calculate the host position score which is obtained by giving a high score to the feature amount in a case where the distribution of the reflection intensity value of the laser light detected by the LIDAR 1 is within a certain range for each point of the matched feature amount (each point of the reflection light). On the contrary, the host position estimation unit 21 calculates the host position score which is obtained by giving a low score to the feature amount in a case where the distribution of the reflection intensity value of the laser light detected by the LIDAR 1 is not within a certain range for each point of the matching feature amount. In such a manner, the host position score changes according to the score given to the feature amount.

(2) The host position estimation unit 21 calculates the host position score, for each location on the map to which the ambient light map information is associated.

(3) Then, the host position estimation unit 21 estimates the position of the host vehicle on the map by a well-known method, based on the host position score, for each location.

In the first and second examples mentioned above, a case where the feature amount for the ambient light is extracted and the host position score is weighted based on the reflection intensity of the laser light has been described as an example. On the contrary, the host position estimation unit 21 calculates the host position score, based on the result of matching between the laser light feature amount extracted from the laser light information generated by the LIDAR 1 and the laser light map feature amount extracted from the laser light map information, which is stored in the map storage unit 3. Then, in a case of calculating the host position score, the host position score may be weighted, based on the reflection intensity of the ambient light detected by the LIDAR 1.

(Sixth Method)

A sixth method of estimating the position of the host vehicle will be described. In the sixth method, when the host position estimation unit 21 calculates the host position score using the feature amount for the laser light and estimates the position of the host vehicle, in a case where the calculated host position score is low, the position of the host vehicle is estimated using the reflection light of the ambient light.

(Specific Example of Sixth Method)

A more detailed specific example in the sixth method will be described with reference to the flowchart of FIG. 7. In the processing shown in FIG. 7, when the estimation processing the position of the host vehicle is started, in a case where the processing reaches the end, the processing is started again from the start after a predetermined time.

Figure 7:
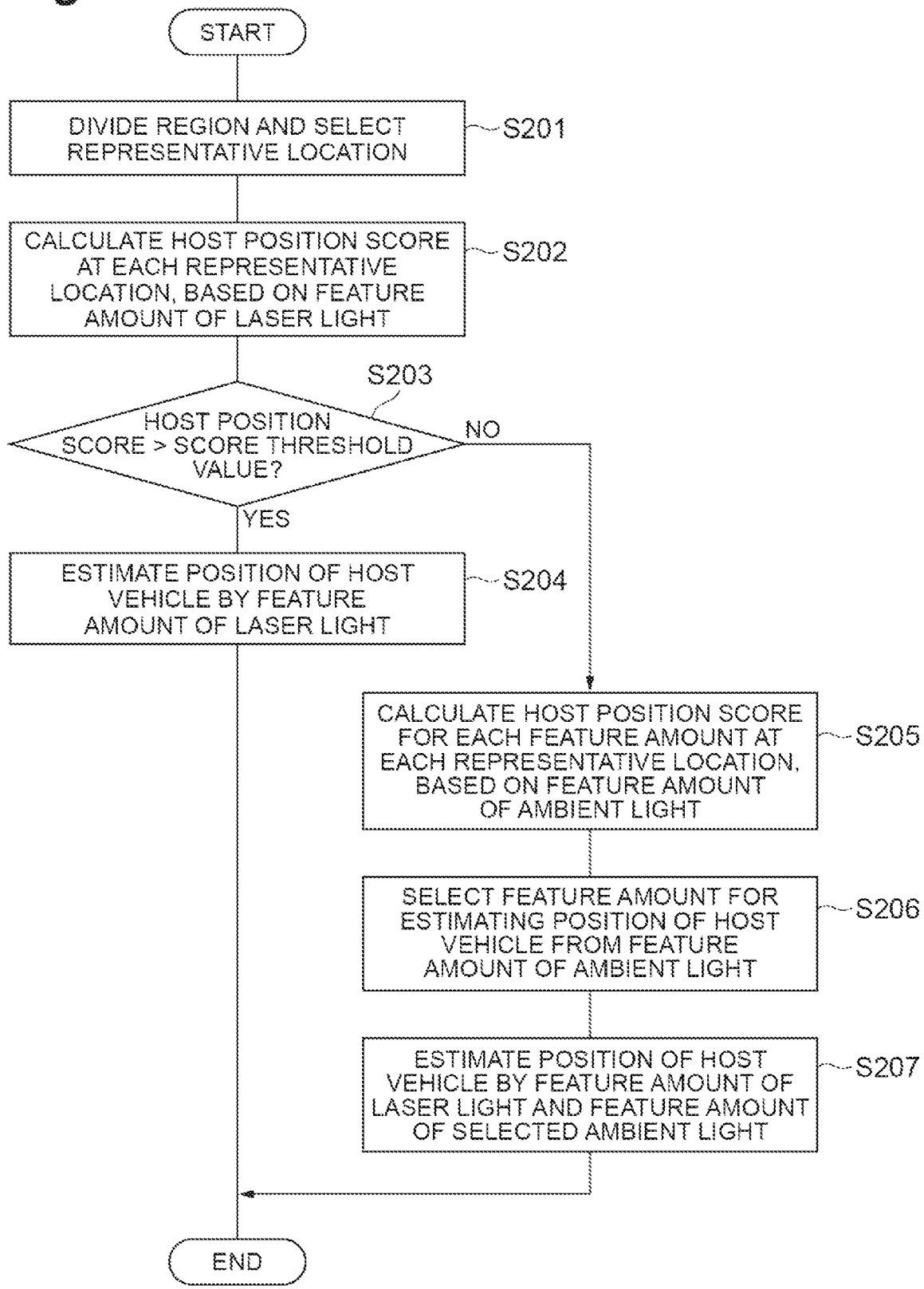
FIG. 7 is a flowchart showing the flow of the estimation processing the position of the host vehicle by the sixth method.

(1) As shown in FIG. 7, the host position estimation unit 21 divides the region, which is for estimating the position of the host vehicle based on the position estimation information of the map storage unit 3, into a plurality of search regions. The host position estimation unit 21 selects a representative location in the search region, for each of the divided plurality of search regions (S201). The host position estimation unit 21 calculates the host position score at each representative location using the feature amount for the laser light (S202). Specifically, for example, the host position estimation unit 21 calculates the host position score for each representative location by a variety of well-known methods, based on the laser light feature amount extracted from the laser light information generated by the laser light processing unit 15 of the LIDAR 1 and the laser light map feature amount extracted from the laser light map information stored by the map storage unit 3 at each representative location.

The host position estimation unit 21 determines whether or not the calculated host position score at each representative location is larger than a predetermined score threshold value (S203). Here, for example, the host position estimation unit 21 may determine whether or not the average value of the host position scores at each representative location is larger than the score threshold value.

In a case where the calculated host position score is larger than the score threshold value (S203: YES), the host position estimation unit 21 estimates the position of the host vehicle by various well-known methods, based on the laser light feature amount extracted from the laser light information and the laser light map feature amount extracted from the laser light map information at each location on the map (S204). Here, the host position estimation unit 21 estimates the position of the host vehicle, based on not the feature amount at the representative location but the laser light map feature amount extracted from the laser light map information at each location on the map.

On the other hand, in a case where the calculated host position score is equal to or less than the score threshold value (S203: NO), the host position estimation unit 21 calculates the host position score at each representative location for each feature amount by using the feature amount for the ambient light (S205). Specifically, for example, the host position estimation unit 21 calculates the host position score, for each representative point by various well-known methods, based on the ambient light feature amount extracted from the ambient light information generated by the ambient light processing unit 16 of the LIDAR 1 and the extracted ambient light map feature amount extracted from the ambient light map information stored by the map storage unit 3 at each representative location. Further, in a case of calculating the host position score for each representative point, the host position estimation unit 21 calculates the host position score, for each extracted feature amount (for each ambient light feature amount and each ambient light map feature amount).

The host position estimation unit 21 selects the feature amount used for estimating the position of the host vehicle together with the feature amount for the laser light, among the feature amounts for the ambient light used in a case of calculating the host position score (S206). For example, the host position estimation unit 21 may select a predetermined number of feature amounts in order from the feature amount having the highest host position score. Further, the host position estimation unit 21 may select a predetermined number of feature amounts. Alternatively, in a case where the host position estimation unit 21 adds the feature amount for the ambient light to the feature amount for the laser light and performs the host position estimation, until the host position score is greater than a predetermined reference score threshold value, the feature amount for the ambient light may be selected in descending order of the host position score.

The host position estimation unit 21 estimates the position of the host vehicle by various well-known methods, based on the feature amount (the ambient light feature amount and the ambient light map feature amount) for the selected ambient light, in addition to the laser light feature amount extracted from the laser light information and the laser light map feature amount at each location on the map extracted from the laser light map information (S207). Here, the host position estimation unit 21 estimates the position of the host vehicle, based on not the feature amount at the representative location but the feature amount extracted from the laser light map information and the ambient light map information at each location on the map.

The above description gives an exemplary case of using the reflection light of the ambient light in a case where the host position score is calculated using the feature amount for the laser light and the calculated host position score is low. On the contrary, the host position estimation unit 21 may calculate the host position score using the feature amount for the ambient light, and may estimate the position of the host vehicle by using the reflection light of the laser light in a case where the calculated host position score is low.

As mentioned above, the vehicle position estimation apparatus 100 includes a host position estimation unit 21 that estimates the position of the host vehicle, based on the result of light reception of the reflection light of the laser light and the result of light reception of the reflection light of the ambient light. For example, even in a case where there is an object target which is unlikely to be detected with laser light, the object target may be detected, based on the reflection light of the ambient light. Therefore, the vehicle position estimation apparatus 100 is able to accurately estimate the position of the host vehicle by using the reflection light of the ambient light other than the laser light in addition to the reflection light of the laser light.

In a case where the host position estimation unit 21 estimates the position of its host vehicle by the first method mentioned above, the host position estimation unit 21 calculates the laser light matching information and the ambient light matching information. The laser light matching information is a result of matching between the laser light information generated by the laser light processing unit 15 and the laser light map information stored in the map storage unit 3. The ambient light matching information is a result of matching between the ambient light information generated by the ambient light processing unit 16 and the ambient light map information stored in the map storage unit 3. Then, the host position estimation unit 21 estimates the position of the host vehicle, based on the calculated laser light matching information and the calculated ambient light matching information. In such a case, the vehicle position estimation apparatus 100 is able to accurately estimate the position of the host vehicle by using the laser light matching information and the ambient light matching information.

In a case of estimating the position of the host vehicle by the second method mentioned above, the host position estimation unit 21 calculates the integrated sensor information by integrating the laser light information generated by the LIDAR 1 and the ambient light information, and calculates the integrated map information by integrating the laser light map information stored in the map storage unit 3 and the ambient light map information. Then, the host position estimation unit 21 estimates the position of the host vehicle, based on the calculated integrated sensor information and the calculated integrated map information. In such a case, the vehicle position estimation apparatus 100 is able to accurately estimate the position of the host vehicle, based on the integrated sensor information and the integrated map information.

Here, in a case of estimating the position of the host vehicle by the second method, the integrated map information, in which the laser light map information and the ambient light map information are integrated, may be written in advance in the map storage unit 3, for each location on the map. Even In such a case, the vehicle position estimation apparatus 100 may accurately estimate the position of the host vehicle, based on the integrated sensor information generated based on the result of light reception of the LIDAR 1 and the integrated map information stored in the map storage unit 3. Further, since the integrated map information is stored in advance in the map storage unit 3, the vehicle position estimation apparatus 100 is able to estimate the position of the host vehicle at a higher speed.

In a case of estimating the position of the host vehicle by the third method mentioned above, the host position estimation unit 21 estimates the position of the host vehicle using the feature amount for object target detection. Here, the host position estimation unit 21 calculates the laser light feature amount information by matching the laser light feature amount extracted from the laser light information generated by the LIDAR 1 with the laser light map feature amount extracted from the laser light map information stored in the map storage unit 3. Further, the host position estimation unit 21 calculates the ambient light feature amount information by matching the ambient light feature amount extracted from the ambient light information generated by the LIDAR 1 with the ambient light map feature amount extracted from the ambient light map information stored in the map storage unit 3. Then, the host position estimation unit 21 estimates the position of the host vehicle, based on the calculated laser light feature amount information and the calculated ambient light feature amount information. In such a case, the vehicle position estimation apparatus 100 is able to accurately estimate the position of the host vehicle, based on the laser light feature amount information and the ambient light feature amount information.

Here, in a case of estimating the position of the host vehicle by the third method, the map storage unit 3 may store, in advance, the laser light map feature amount extracted from the laser light map information and the ambient light map feature amount extracted from the ambient light map information, at each location on the map. In such a case, the host position estimation unit 21 calculates the laser light feature amount information by matching the laser light feature amount extracted from the laser light information generated by the LIDAR 1 with the laser light map feature amount stored in the map storage unit 3. Further, the host position estimation unit 21 calculates the laser light feature amount information by matching the ambient light feature amount extracted from the ambient light information generated by the LIDAR 1 with the laser light map feature amount stored in the map storage unit 3. Then, the host position estimation unit 21 estimates the position of the host vehicle, based on the calculated laser light feature amount information and the calculated ambient light feature amount information. Even In such a case, the vehicle position estimation apparatus is able to accurately estimate the position of the host vehicle, based on the laser light feature amount information and the ambient light feature amount information. Further, the laser light map feature amount and the ambient light map feature amount are stored in advance in the map storage unit 3. Therefore, the vehicle position estimation apparatus 100 is able to estimate the position of the host vehicle at a higher speed.

In a case of estimating the position of the host vehicle by the fourth method mentioned above, the host position estimation unit 21 estimates the position of the host vehicle using the feature amount for object target detection. Here, the host position estimation unit 21 calculates the sensor feature amount information by integrating the laser light feature amount extracted from the laser light information generated by the LIDAR 1 and the ambient light feature amount extracted from the ambient light information. Further, the host position estimation unit 21 calculates map feature amount information by integrating the laser light map feature amount extracted from the laser light map information stored in the map storage unit 3 and the ambient light map feature amount extracted from the ambient light map information. Then, the host position estimation unit 21 estimates the position of the host vehicle, based on the calculated sensor feature amount information and the calculated map feature amount information. In such a case, the vehicle position estimation apparatus 100 is able to accurately estimate the position of the host vehicle, based on the sensor feature amount information and the map feature amount information.

Here, in a case of estimating the position of the host vehicle by the fourth method, the map storage unit 3 may store, in advance, the map feature amount information, in which the laser light map feature amount extracted from the laser light map information and the ambient light map feature amount extracted from the ambient light map information are integrated, at each location on the map. In such a case, the host position estimation unit 21 calculates the sensor feature amount information by integrating the laser light feature amount and the ambient light feature amount extracted from the laser light information and the ambient light information generated by the LIDAR 1. Then, the host position estimation unit 21 estimates the position of the host vehicle, based on the calculated sensor feature amount information and the calculated map feature amount information which is stored in the map storage unit 3. Even In such a case, the vehicle position estimation apparatus 100 is able to accurately estimate the position of the host vehicle, based on the sensor feature amount information and the map feature amount information. Further, the map feature amount information is stored in advance in the map storage unit 3. Therefore, the vehicle position estimation apparatus 100 is able to estimate the position of the host vehicle at a higher speed.

Although the embodiments of the present disclosure have been hitherto described above, the present disclosure is not limited to the above embodiment. The present disclosure may be modified in various ways without departing from the spirit of the present disclosure.

What is claimed is:

1. A vehicle position estimation apparatus that estimates a position of a host vehicle, the vehicle position estimation apparatus comprising:
    a laser light irradiation unit configured to illuminate laser light;
    a light reception unit configured to receive reflection light of the laser light and reflection light of ambient light which is light other than the laser light, and to detect an intensity of the received reflection light of the laser light and an intensity of the received reflection light of the ambient light;
    an estimation unit configured to estimate the position of the host vehicle, based on a result of light reception of the reflection light of the laser light received by the light reception unit and a result of light reception of the reflection light of the ambient light; and
    a map storage unit configured to store, in advance, laser light map information based on the result of the light reception of the reflection light of the laser light and ambient light map information based on the result of the light reception of the reflection light of the ambient light for each location on a map,
    wherein the estimation unit is further configured to:
        extract a feature amount for object target detection as a laser light feature amount from the result of the light reception of the reflection light of the laser light received by the light reception unit, and extract a feature amount for object target detection as a laser light map feature amount from the laser light map information;
        select a plurality of representative locations in a region for estimating the position of the host vehicle, and calculate a host position score indicating a possibility that the host vehicle is present for each of the plurality of representative locations based on the laser light feature amount and the laser light map feature amount;
        estimate the position of the host vehicle based on the laser light feature amount and the laser light map feature amount when the calculated host position score is larger than a predetermined score threshold value;
        extract a feature amount for object target detection as an ambient light feature amount from the result of the light reception of the reflection light of the ambient light received by the light reception unit, and extract a feature amount for object target detection as an ambient light map feature amount from the ambient light map information when the calculated host position score is less than or equal to the predetermined score threshold value;
        calculate the host position score for each of the plurality of representative locations based on the ambient light feature amount and the ambient light map feature amount, and select the ambient light feature amount and the ambient light map feature amount used for estimating the position of the host vehicle based on a degree of the calculated host position score; and
        estimate the position of the host vehicle based on the ambient light feature amount and the ambient light map feature amount selected in addition to the laser light feature amount and the laser light map feature amount.

2. The vehicle position estimation apparatus according to claim 1, wherein the estimation unit is further configured to select the ambient light feature amount and the ambient light map feature amount in descending order of the calculated host position score until an estimated host position score of the position of the host vehicle is greater than a predetermined reference score threshold value, in a case where the ambient light feature amount and the ambient light map feature amount are added to the laser light feature amount and the laser light map feature amount to estimate the position of the host vehicle, when selecting the ambient light feature amount and the ambient light map feature amount used for estimating the position of the host vehicle based on the degree of the calculated host position score.

* * * * *